June 7, 1966 R. L. SMIRL 3,254,748
CLUTCH LINKAGE SYSTEM
Filed Sept. 27, 1963 12 Sheets-Sheet 3
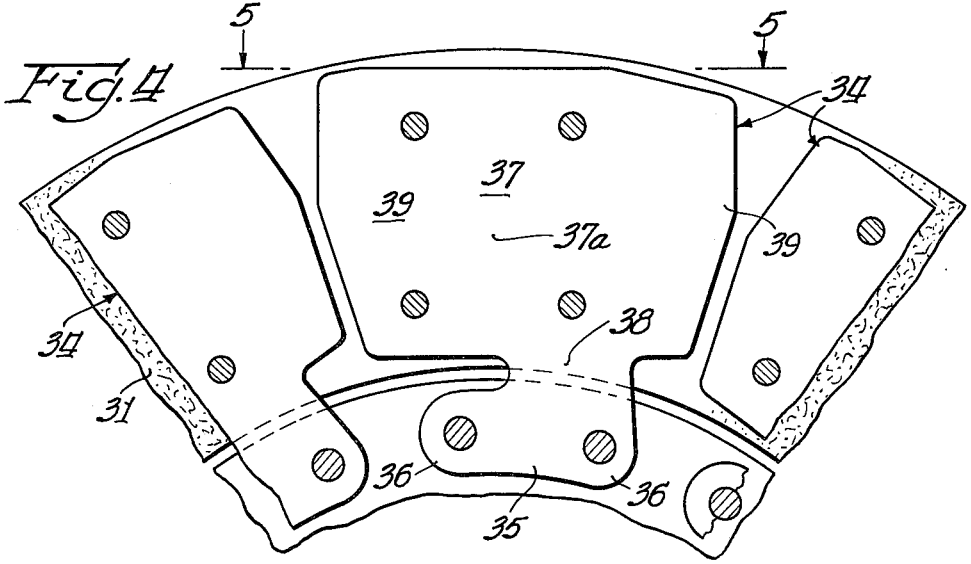
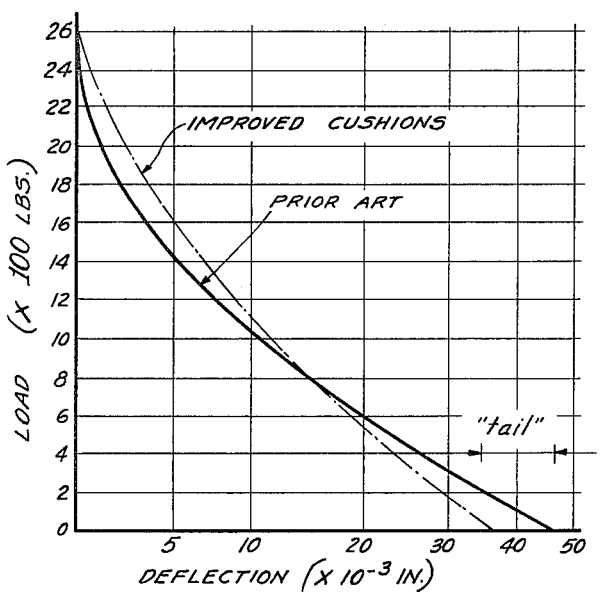
Inventor:
Richard L. Smirl
By: Joseph W. Malleck Atty

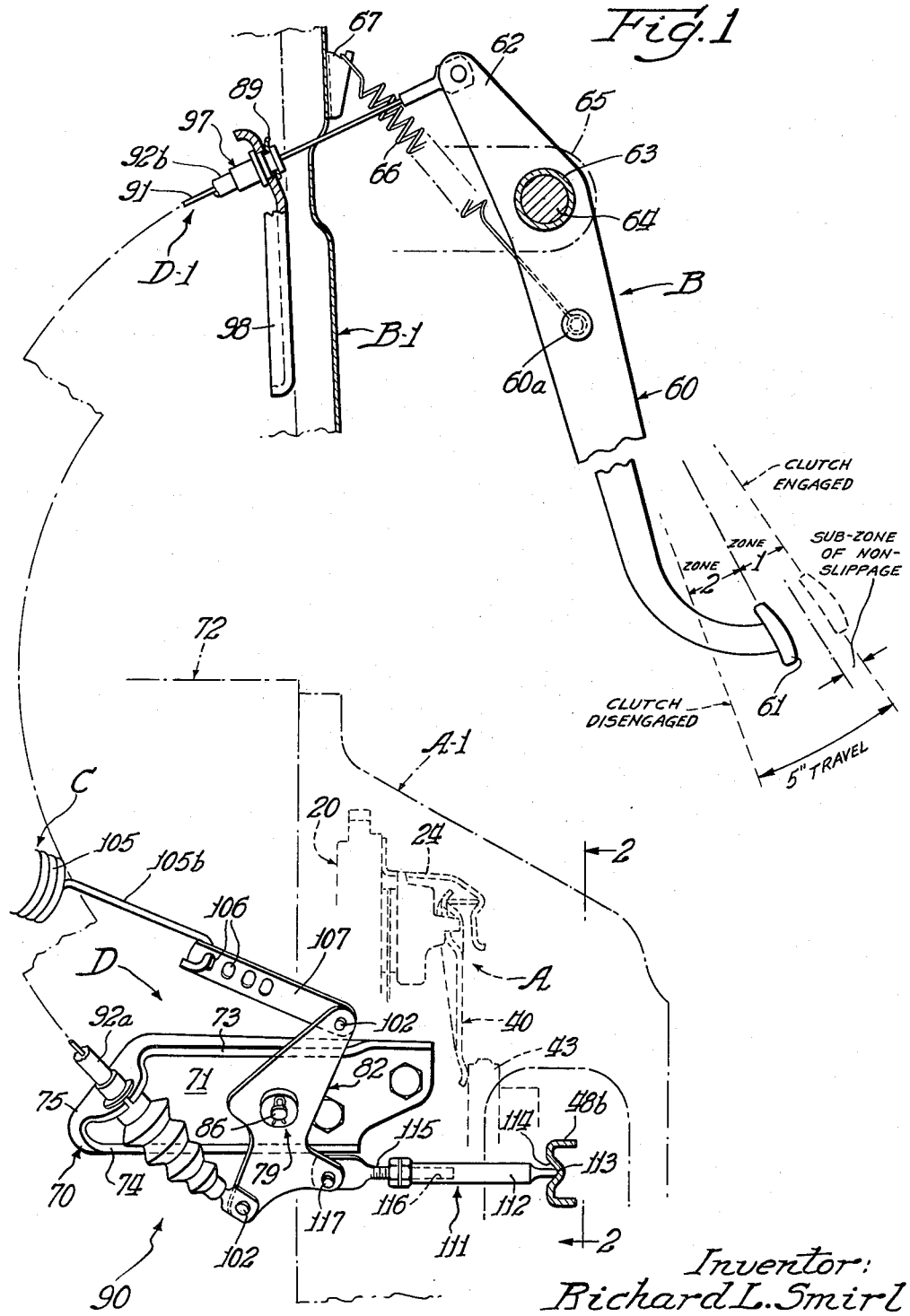

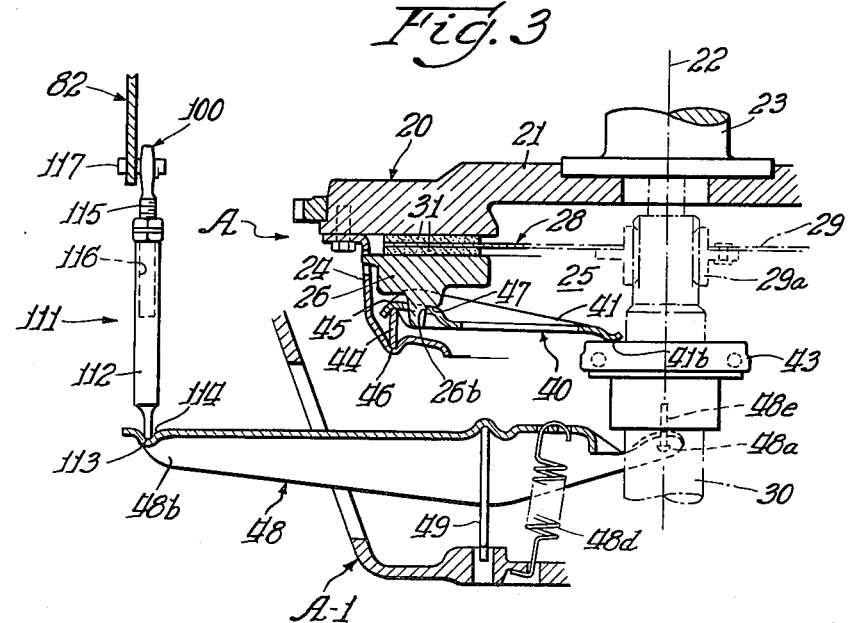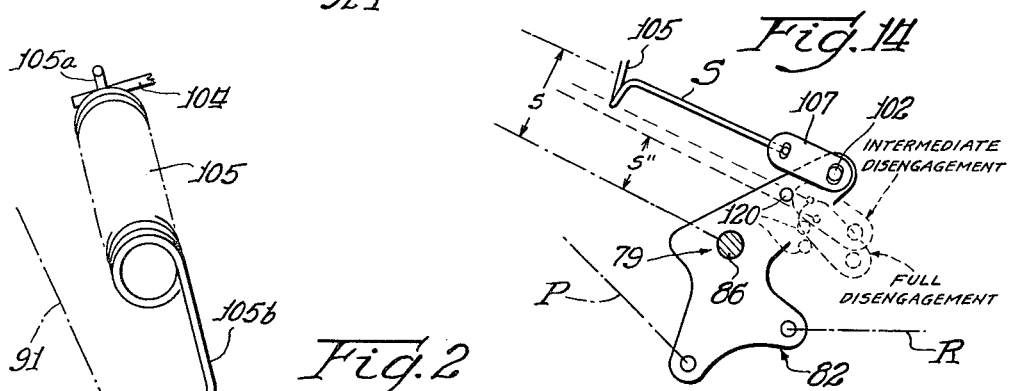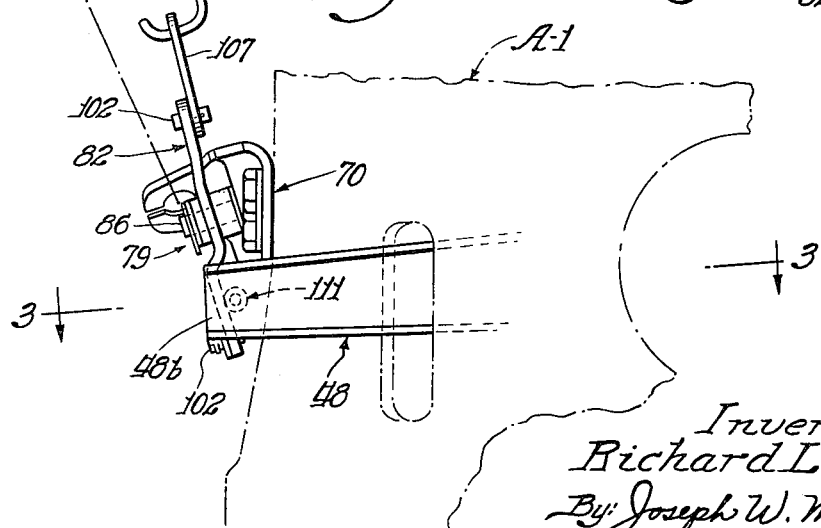

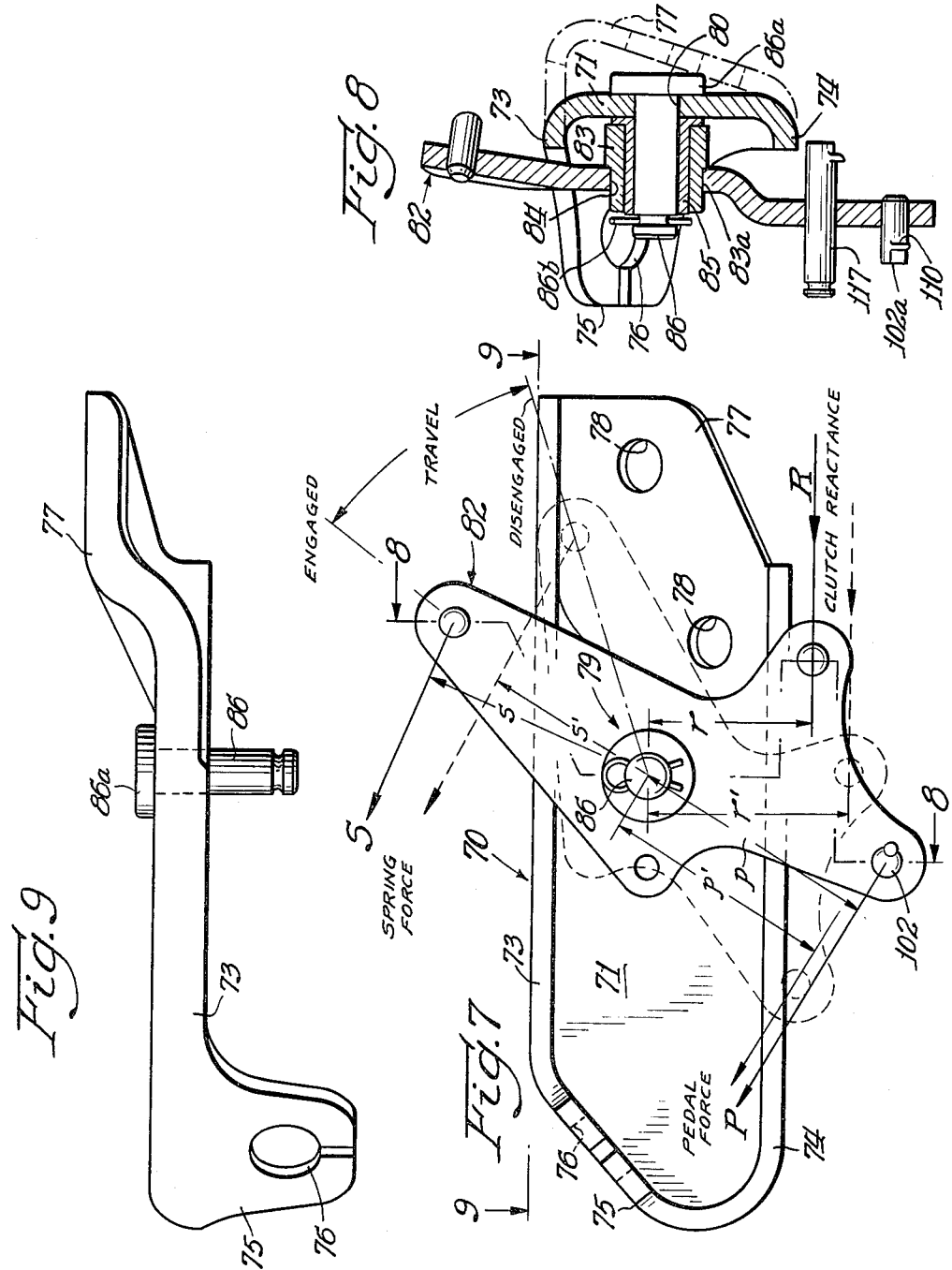

June 7, 1966 R. L. SMIRL 3,254,748
CLUTCH LINKAGE SYSTEM
Filed Sept. 27, 1963 12 Sheets-Sheet 5
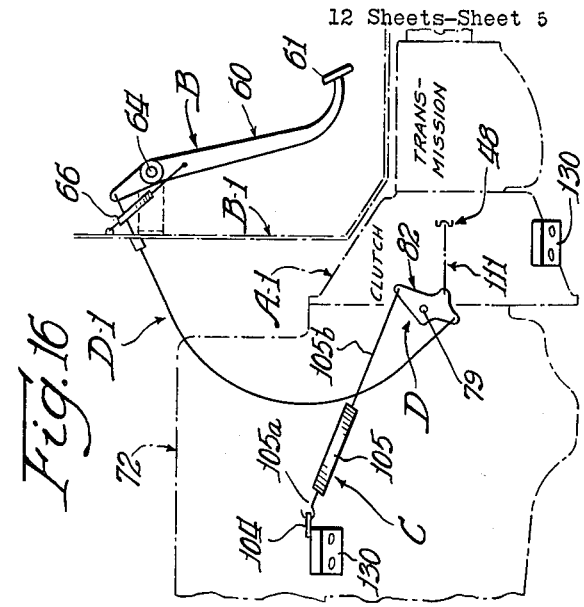
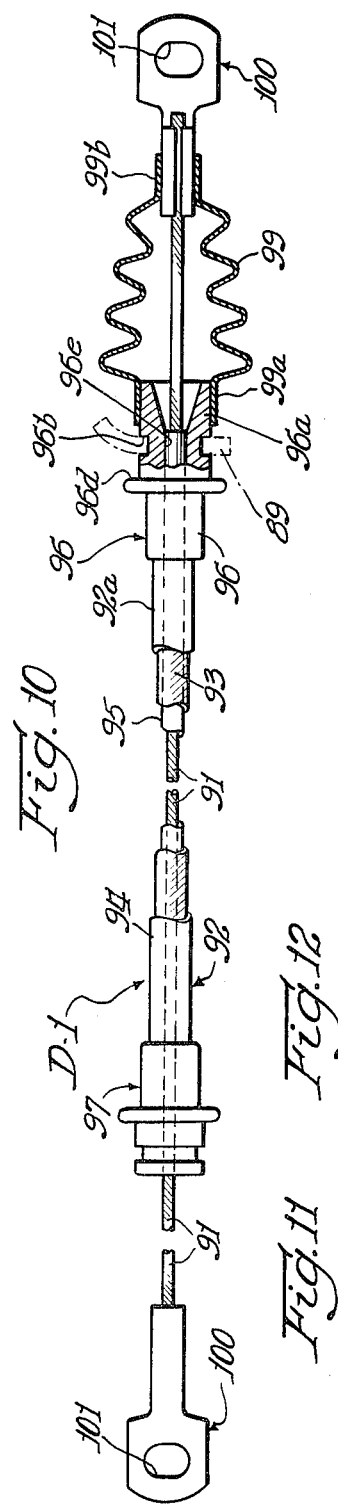
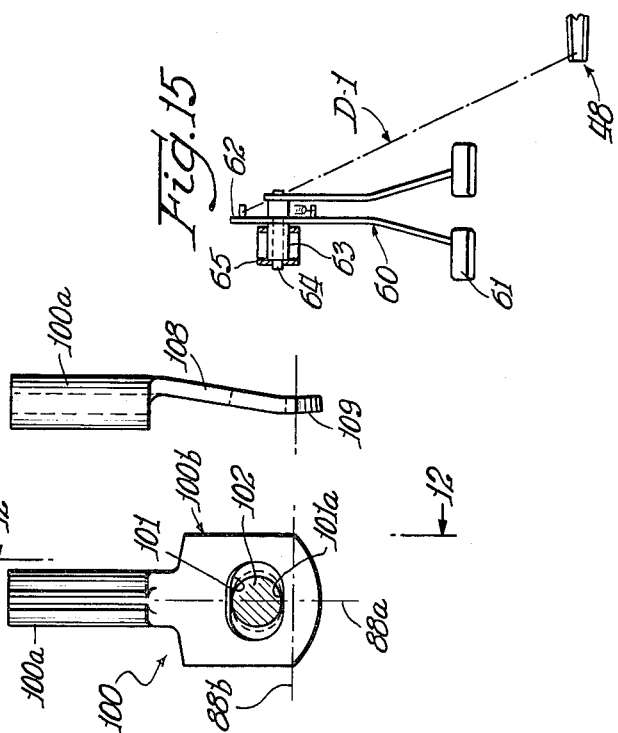
Inventor:
Richard L. Smirl
By: Joseph W. Malleck Atty

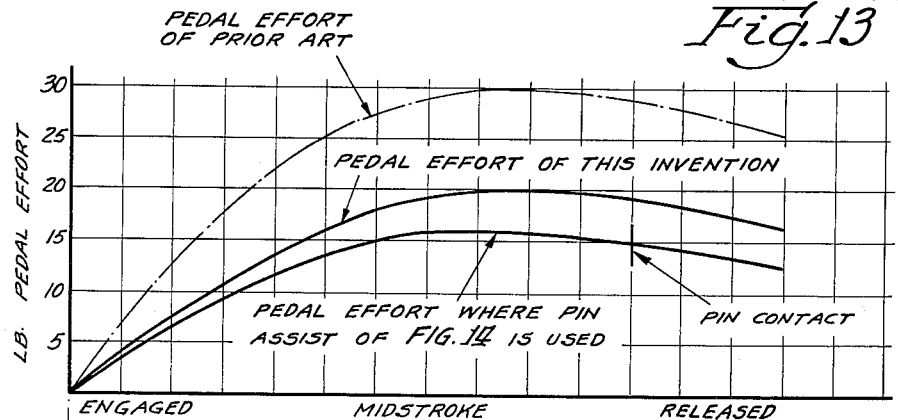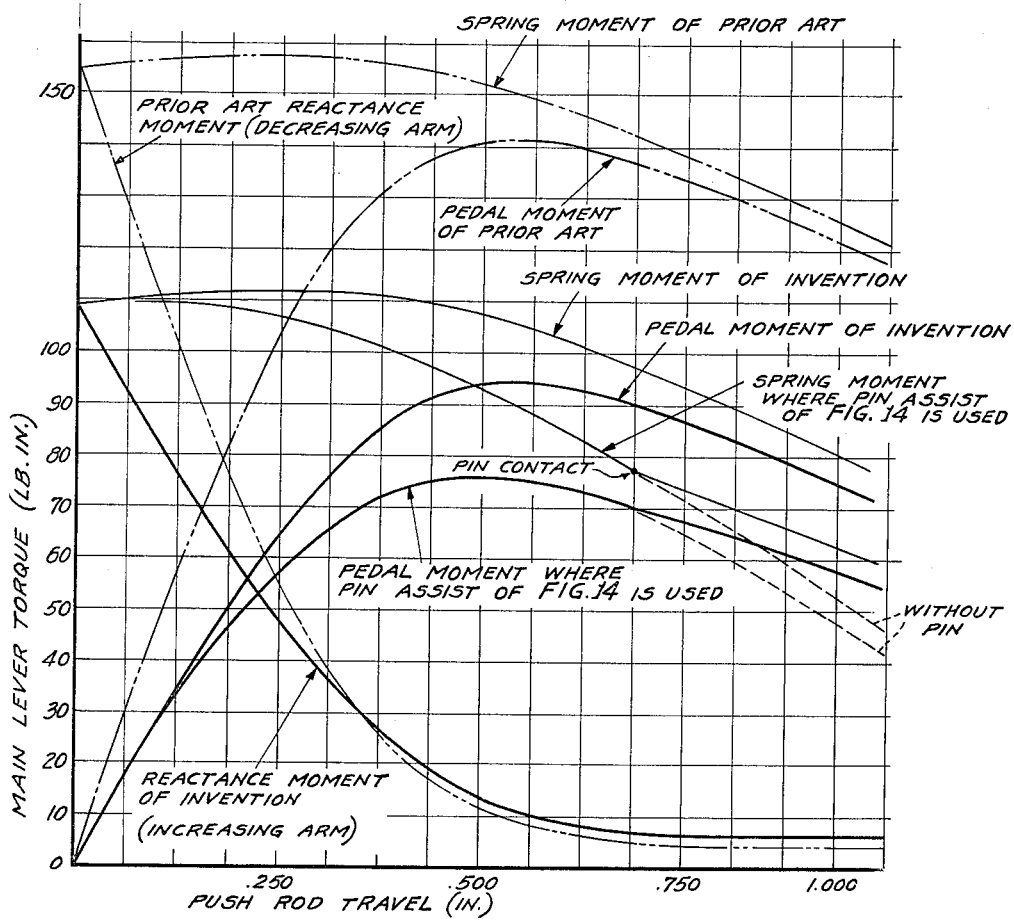

June 7, 1966  R. L. SMIRL  3,254,748
CLUTCH LINKAGE SYSTEM
Filed Sept 27, 1963  12 Sheets-Sheet 7
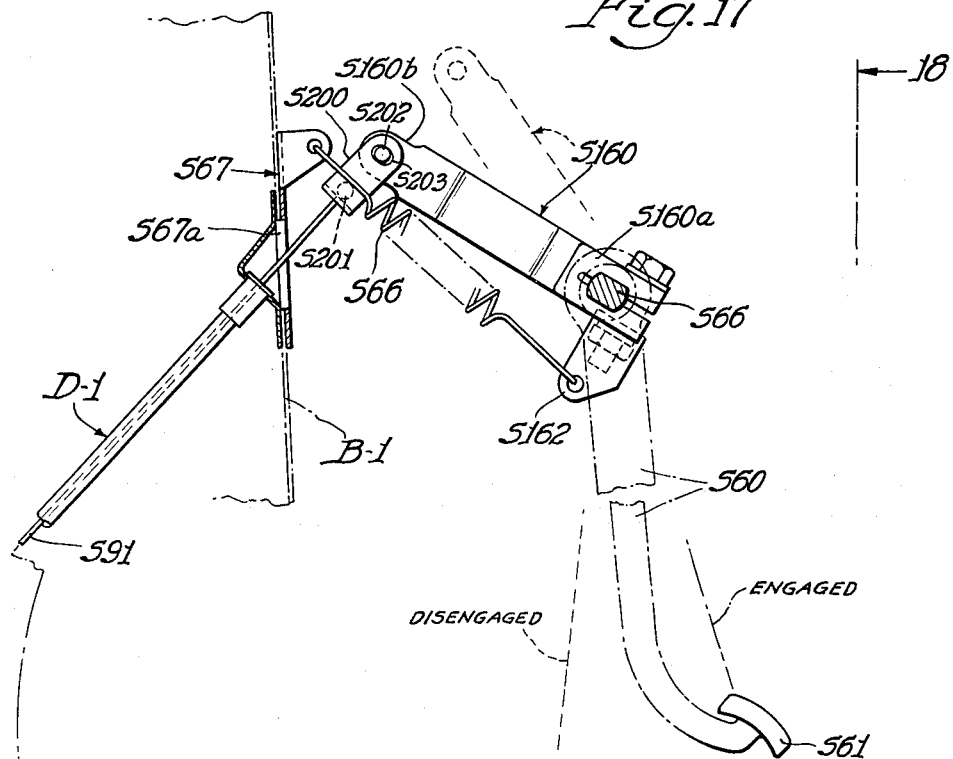
Fig. 17
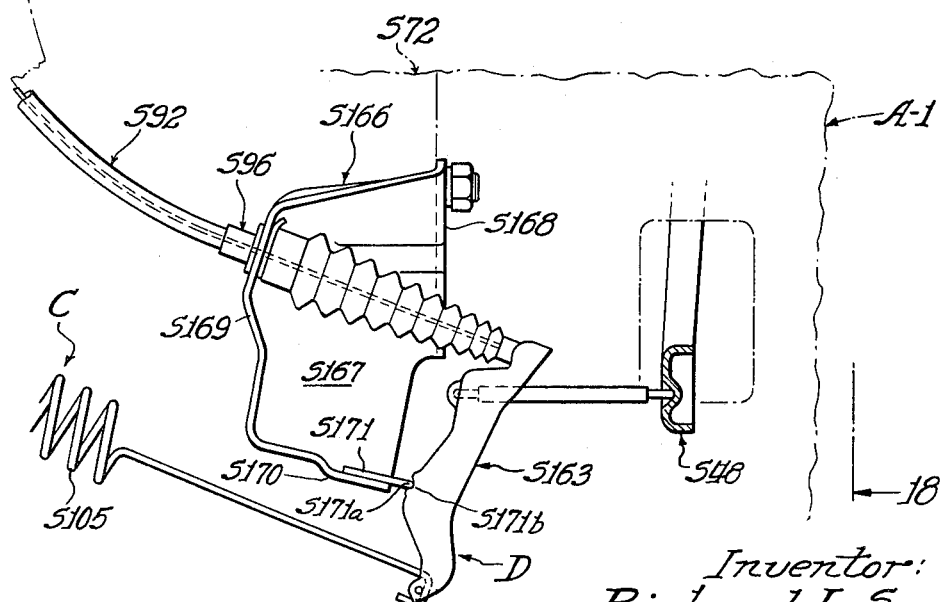
Inventor:
Richard L. Smirl
By: Joseph W. Malleck Atty.

June 7, 1966 R. L. SMIRL 3,254,748
CLUTCH LINKAGE SYSTEM
Filed Sept. 27, 1963 12 Sheets-Sheet 8
Fig. 18
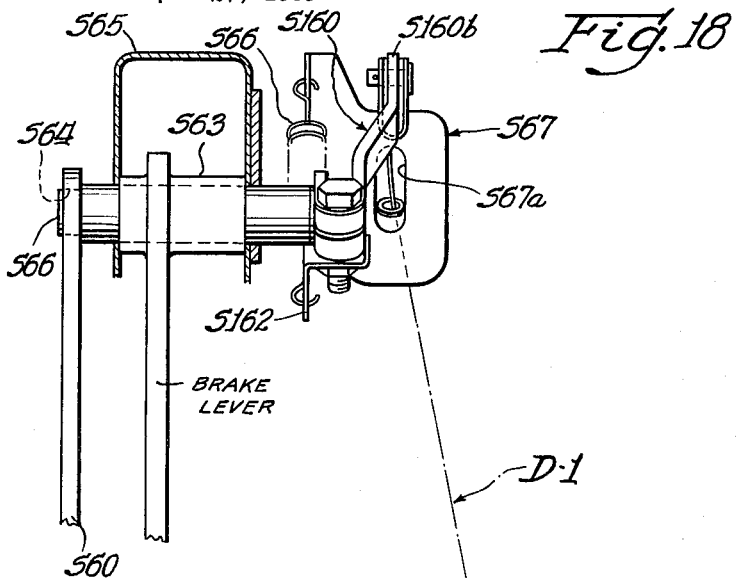
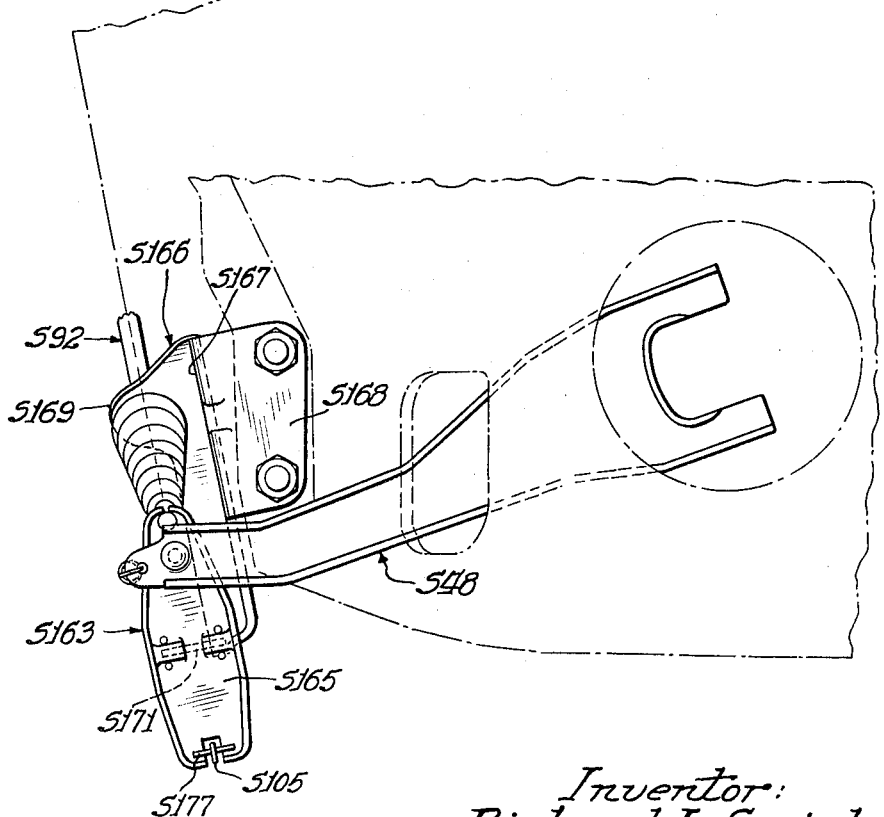
Inventor:
Richard L. Smirl
By: Joseph W. Malleck Atty.

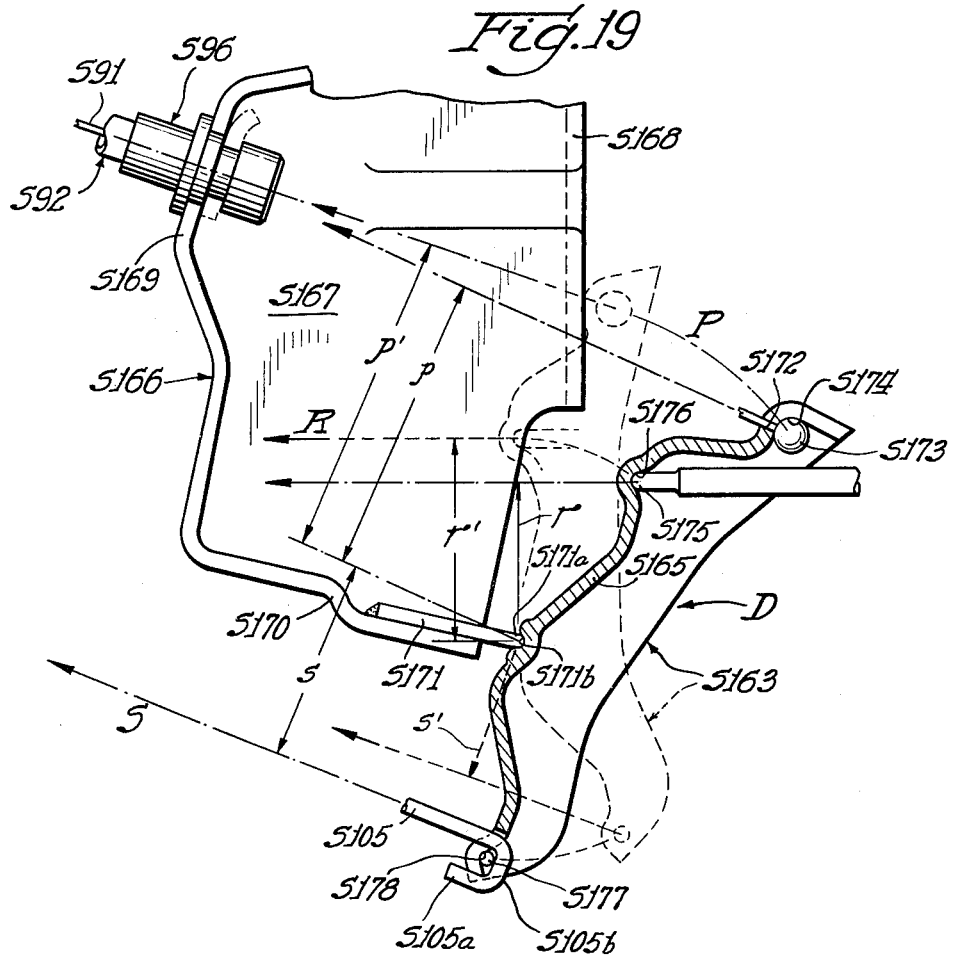

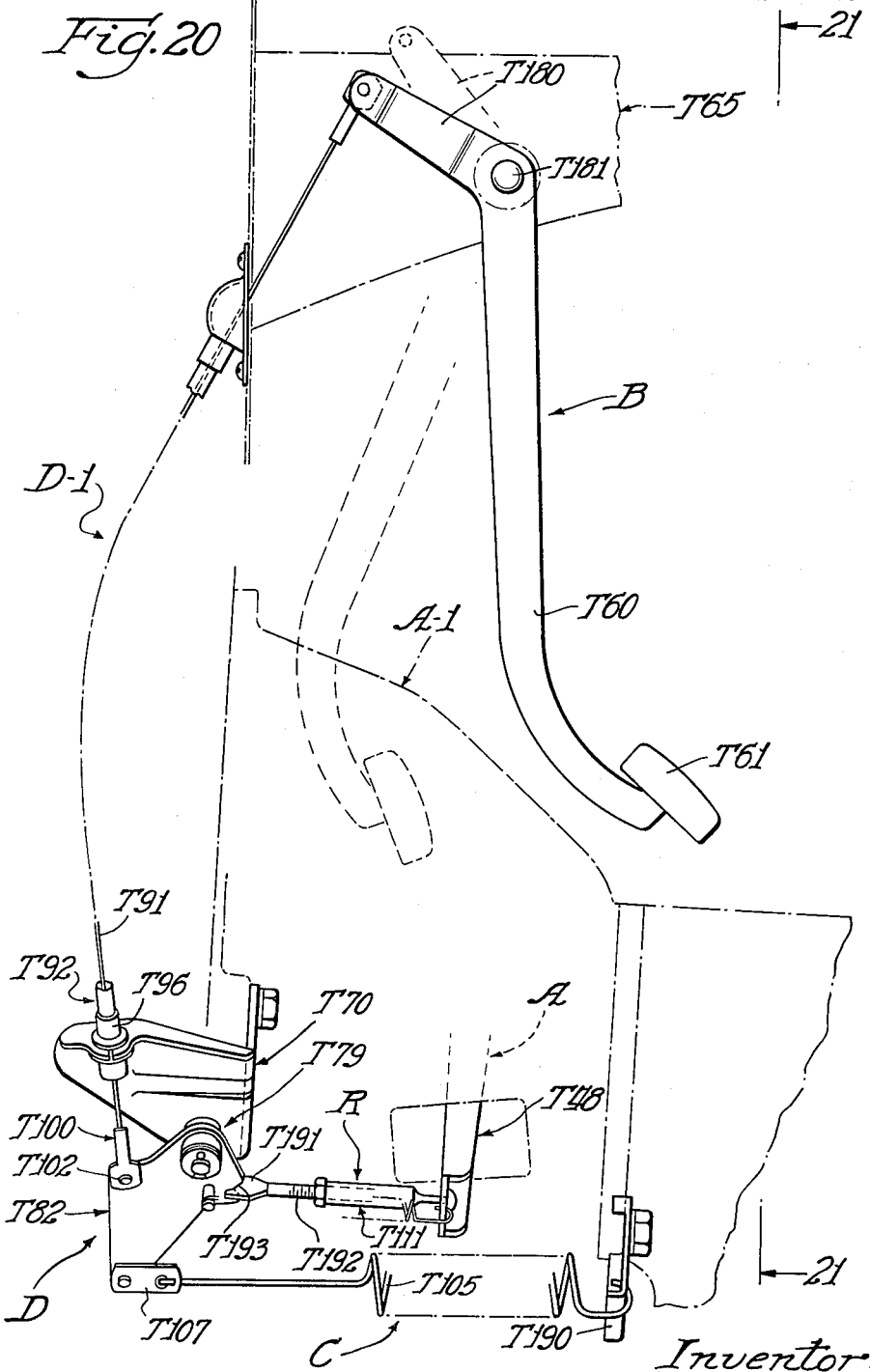

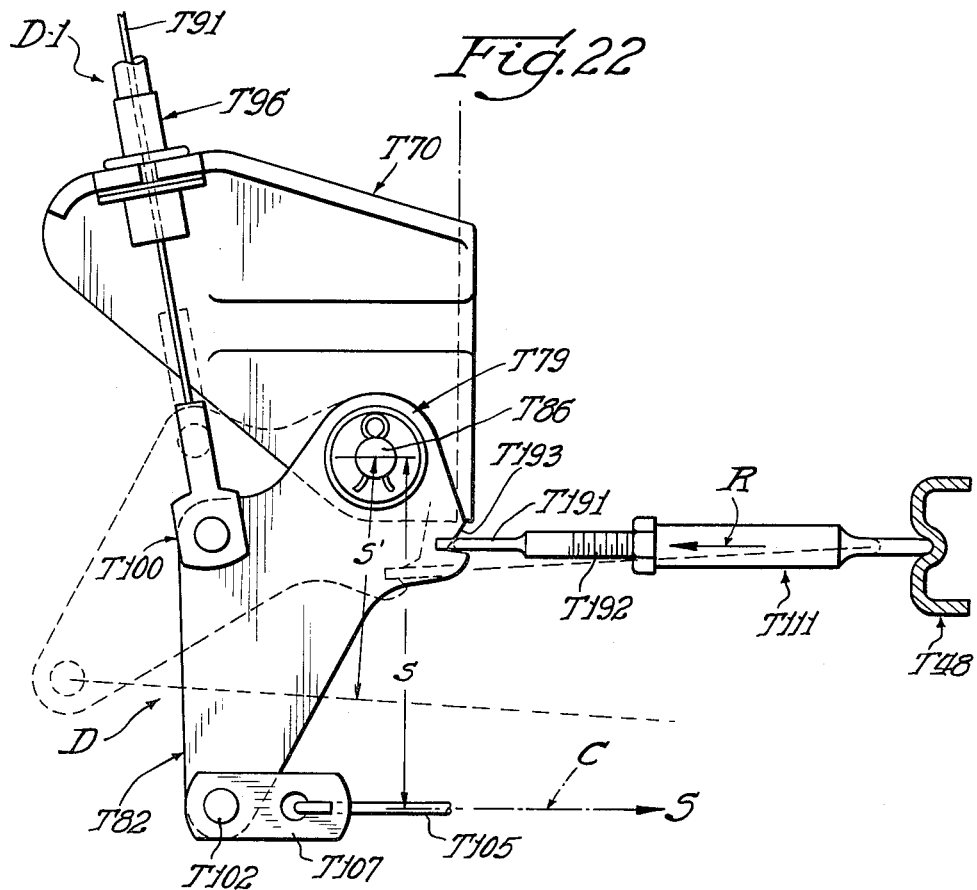
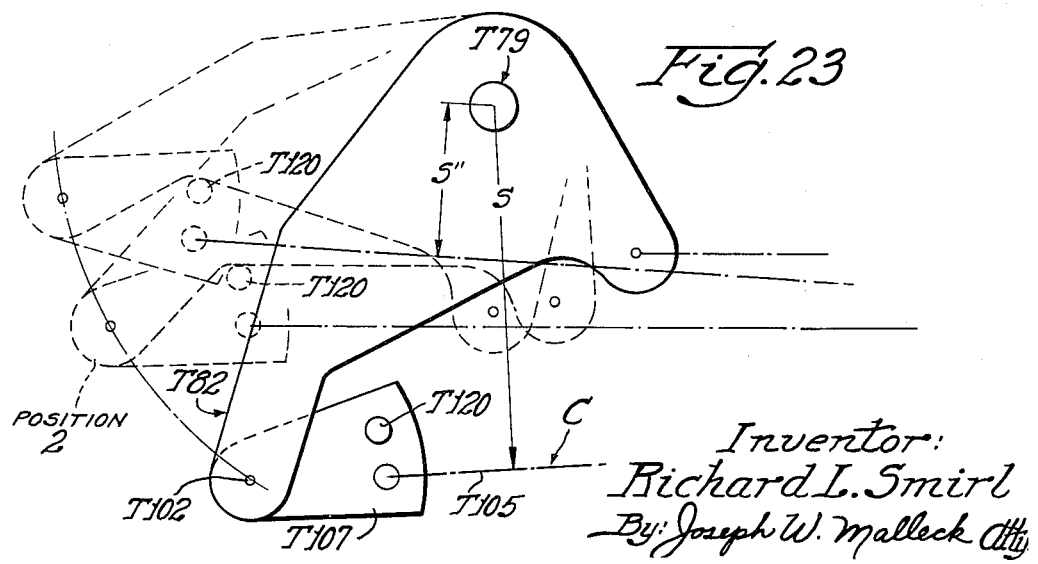

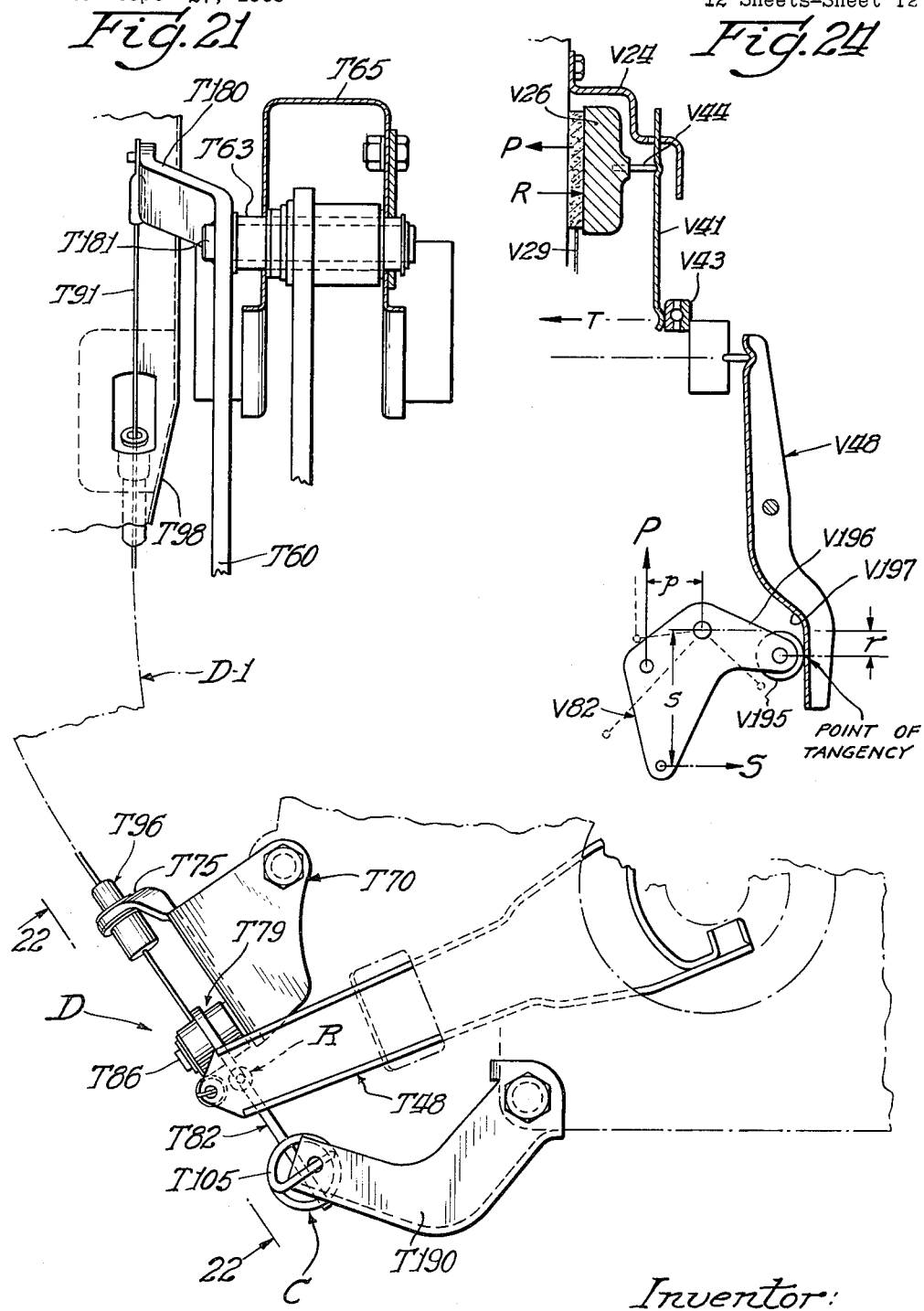

United States Patent Office 3,254,748
Patented June 7, 1966

3,254,748
CLUTCH LINKAGE SYSTEM
Richard L. Smirl, La Grange Park, Ill., assignor to Borg-Warner Corporation, Chicago, Ill., a corporation of Illinois
Filed Sept. 27, 1963, Ser. No. 312,029
21 Claims. (Cl. 192—99)

This invention relates to friction mechanisms and more particularly to an improved remote spring type clutch having novel force transmitting means interconnecting the clutch pedal with the clutch.

Up until the present time, substantially all vehicles have used conventional clutches of the type wherein a pressure plate load resulted from the use of several coil springs or a diaphragm spring acting directly on the pressure plate; the springs were completely enclosed within the clutch housing. In a remote spring clutch the clutch engaging spring is disposed outside of the clutch housing and depends upon control linkage to transmit its force by way of a clutch release bearing and internal clutch levers to the pressure plate. Although the advantages of a remote spring type clutch have been known for some time, there has been continued resistance to employing such clutches on vehicles because of resulting uncomfortable pedal effort and difficulty in accommodating the linkage and springs within the confines of available space. These disadvantages are attributable to the unrefined characteristics of the first conceptual remote spring type clutches.

It is, therefore, a primary object of this invention to provide a highly refined and improved friction mechanism of the remote spring type, having operating characteristics superior to those now known in the art.

It is characteristic of most passenger vehicle clutches to have a driven plate employing stamped sheet metal cushions as resilient means supporting the annular friction facings. The cushions give a resilient backing to the facings and are completely flexed (become flat) when the clutch is fully engaged. At complete engagement the cushion springs exert a maximum reaction force upon the conventional pressure plate used to promote clutch engagement. This reaction force dissipates relatively quickly upon the disengaging movement of the clutch pedal and takes place within a micrometer zone of movement of the pressure plate. The present state of the art has not fully utilized the reaction force of the cushions to assist and achieve a softer clutch pedal effort.

It is, accordingly, another object of this invention to provide a friction mechanism wherein the effect of the force of cushion springs normally employed in the clutch driven plate is increasingly assisted by novel force transmitting means, so that the expected drop-off in cushion reactance force is increasingly offset, promoting a softer starting of pedal movement. A specific structural feature pursuant to the above object is the employment of a force transmitting means having a pivotal member interconnecting the manual means (clutch foot pedal) and the clutch actuating means, whereby the moment arm of the cushion reactance force transmitted to said pivotal member is increased as the manual means is moved from an engaged condition of the mechanism to a fully disengaged condition. If positive linkage is employed between the pivotal member and the clutch actuating means (such as a straight link), the increasing moment arm may be characterized in other terms, whereby the angle formed between the pivot arm and the link changes from an obtuse angle to a less obtuse angle as the mechanism is disengaged. The degree to which the starting pedal effort may be reduced is dependent on size and space limitations of the linkage; however, the above feature permits greater reduction in starting pedal effort by any known remote spring type clutch within the same given amount of space and mounting provisions.

The resultant torque or moment of the cushion reaction force may also be affected by the moment of the spring force normally used to engage the clutch, and the moment of the manual means employed to disengage the clutch. However, for all practical purposes the moment of the spring force must be of a decreasing nature in order to retain the peak pedal load within comfortable limits. Similarly, the moment of the manual means about the pivotal reaction plate may be adjusted to have a varying moment arm, but the effect will be secondary to the increasing moment arm of the plate cushion reactance to act as an assistance. This invention further contemplates alternative connecting means which alter the pedal effort curve to achieve changes at the extremes of the curve, affording flexibility to better meet the user's requirements. Such flexibility of operating characteristics could not be achieved by simple geometrical variance in prior art constructions.

In the normal travel of a manually operated means (clutch pedal) utilized to actuate a friction mechanism, it is convenient for discussion to speak about first and second zones of travel in proceeding from the engaged to the disengaged positions. It is during the first zone of travel toward disengagement that the interengaging friction portions of the mechanism are undergoing a separation movement while yet having varying degrees of interengagement. During this first zone, slippage does not occur between the friction portions. It is important during this first zone of travel that the friction portions be less sensitive to the pedal movement so that controllability is increased beyond that needed in the second zone of travel.

Therefore, it is still another object of this invention to provide a remote spring type friction mechanism in which the interengaging friction portions are caused to respond at different rates of movement during the disengaging operation in response to continuous manual effort, thereby providing a slow-fast sequence in the separation movement of the friction portions. Specific structural features to achieve the latter object are in effect a corollary to the structural features providing reduced starting pedal effort. A force transmitting means is provided between the manual means and clutch actuating means whereby the pivot arm of the means connecting with the clutch is caused to have small linear increments of movement during the first zone of disengagement for each unit of movement of the clutch pedal, than the linear increments of movement experienced during the second zone of movement of the clutch pedal. Such slow and fast movement of the friction portions may be further assisted by varying the pivotal connection of the manual means with respect to said force transmitting means, whereby greater units of turning moment will cause the pedal to be moved through a greater arc to apply a given mechanical advantage.

A significant difficulty encountered with conventional clutches as well as with the known types of remote spring clutches is the inability to precisely calibrate the linkage or force transmitting means, so as to achieve a lower pedal effort as well as smaller size resilient engaging means. Discrepancies in calibration must be compensated for in known constructions; traditionally the constructions have included inflexible linkage, and it has been characteristic to employ extended pantograph linkage partly supported on the body frame of the vehicle and partly on the engine assembly. The pantograph linkage as well as other portions of prior art constructions have features which cause parasitic friction, thus draining the available actuating forces and increasing the size of the mechanism to accommodate such losses.

It is accordingly an object of this invention to provide a friction mechanism of the remote spring type which has enhanced calibration over that of the known art, and particularly having novel structure to isolate the force transmitting means from relative movement between the engine assembly and frame of a vehicle, and to substantially obviate parasitic friction losses. Pursuant to this object, and particularly in connection with the mounting facility of the force transmitting means, this invention contemplates providing a force transmitting member pivotally mounted upon an engine assembly (including clutch and transmission secured to the engine), and employing flexible linkage between the manually operated pedal and the force transmitting member. The invention further contemplates employment of improved connections for the force transmitting means which utilizes rolling and rocking antifriction connections as well as means for localizing inherent rubbing to a minimum. The force transmitting means further is characterized by having a unitary pivotal reaction plate adapted for being connected to each of the manually operated means, the clutch engaging means and the clutch actuating means, wherein the unitary plate permits precise arrangement of the moment geometry for increased accuracy of calibration.

Still another object of this invention is to provide a friction mechanism having greater capacity and increased service-free life for a given size mechanism. Prior art constructions have traditionally utilized at least 6% of the clutch pedal travel as a back lash or lost motion pick-up. This was necessary because the clutch pedal was adapted to come back to a predetermined starting position while accommodating wear of the friction elements; the lost motion connection was provided to give a certain amount of free play before effective actuation of the clutch linkage means was promoted. A feature of the instant invention is the provision of force transmitting means, which by its own inherent reaction holds the clutch pedal in an upright inactive position. It is directly responsive to changes in the friction element surfaces. There is no back lash motion provided, and the clutch pedal will adjust slightly within a limited range to accommodate gradual wear requiring less service attention and insuring that the clutch will be properly adjusted at all times. Prior art clutches experience short periods of mis-adjustment until steps are taken to adjust the linkage for wear at prescribed intervals.

Another feature pursuant to increasing service life is the ability to locate the clutch engaging spring in a remote position where friction generated heat is not directly transferred thereto, thereby obviating wilting and decreased spring life. With the ability of the clutch pedal to utilize its entire stroke or clutch disengaging movement, a greater safety factor is provided by permitting the pedal effort to be kept low without reducing the plate load.

Yet another object of this invention is to provide an improved remote spring type friction mechanism which has unprecedented economy and flexibility of use. Features pursuant to greater flexibility of use is provision of a unitary pivotal reaction plate, having detachable connections with linkage leading to the manual means, resilient means and clutch means. Therefore, to change the capacity of the clutch to meet different requirements of the customer the unitary reaction plate may be substituted with one of a different geometry but utilizing the same resilient engaging spring. Furthermore, the single engaging spring may be adjusted between connected positions or may be substituted by a larger spring to vary the capacity of the clutch. Each of the substitution facilities are simple, economical and thereby reduce the number of parts which a manufacturer must stock to meet the varying requirements of customers. Economy and compactness are directly attributable to the simplified unitary reaction plate for providing force transmission of the various elements of the linkage. The combination of a flexible linkage leading from the clutch pedal to the unitary reaction plate permits extreme flexibility in mounting within the vehicle and the flat silhouette of the reaction plate with its supporting bracket is extremely compact to permit mounting under the most stringent requirements.

Other objects and features of the invention will be readily apparent to those skilled in the art from the specification and appended drawings, illustrating a preferred embodiment and other alternative arrangements in which:

FIG. 1 is an elevational view, partly schematic, of a friction mechanism employing the principles of this invention; alternative operative positions of a clutch pedal are illustrated;

FIG. 2 is a sectional view of a portion of the mechanism of FIG. 1 and taken substantially along line 2—2 of FIG. 1;

FIG. 3 is a horizontal sectional view of the construction taken substantially along line 3—3 of FIG. 2;

FIG. 4 is an enlarged fragmentary plan view of the clutch driven plate illustrating the cushion spring;

FIG. 5 is a view taken along line 5—5 of FIG. 4;

FIG. 6 is a graph illustrating certain operating characteristics of the cushions of FIG. 4;

FIG. 7 is an enlarged elevational view of a portion of the force transmitting means of this invention;

FIG. 8 is a sectional view taken substantially along line 8—8 of FIG. 7;

FIG. 9 is a view taken substantially along line 9—9 of FIG. 7;

FIG. 10 is a view of the flexible linkage D-1 with portions broken away;

FIG. 11 is a greatly enlarged view of a connector and pin;

FIG. 12 is a view taken along line 12—12 of FIG. 11;

FIG. 13 is a graphical illustration of various operating characteristics of the preferred embodiment;

FIG. 14 is a schematic illustration of an alternative modification to the geometry of the spring connection of FIG. 7;

FIG. 15 is a schematic layout illustrating the clutch pedal as normally used in a vehicle in conjunction with related mechanism, and indicating the line of connection with the clutch by use of flexible linkage;

FIG. 16 is still another schematic layout of a vehicle illustrating the mounting characteristics of friction mechanism;

FIG. 17 is an elevational view, partly schematic, of another alternative embodiment of this invention, and illustrating in broken outline alternative positions of the clutch pedal;

FIG. 18 is a view, partly schematic, taken along line 18—18 of FIG. 17;

FIG. 19 is a greatly enlarged view of a portion of the force transmitting means of the embodiment of FIG. 17;

FIG. 20 is an elevational view, partly schematic, of still another alternative embodiment, and showing other operative positions of the clutch pedal in broken outline;

FIG. 21 is a view taken substantially along line 21—21 of FIG. 20;

FIG. 22 is a greatly enlarged view of a portion of the force transmitting means of the embodiment of FIG. 20;

FIG. 23 is an enlarged view of the force transmitting means of FIG. 20 illustrating an alternative pin assist construction; and FIG. 24 is a schematic illustration of yet another alternative embodiment of this invention.

Turning now to the drawings and more particularly to FIGS. 1–15, there is illustrated a preferred embodiment of this invention, comprising in its broad aspects a friction means A (clutch) having a housing A–1 forming part of an engine assembly; manually operated means B (clutch pedal) pivotally mounted on a framework B–1 forming part of a vehicle superstructure mounted for movement relative to the engine assembly. The friction mechanism further comprises resilient friction engaging means C (spring), mounted exterior of the clutch housing A-1; and a force transmitting means D mounted upon said engine assembly and employing flexible linkage D-1 to interconnect said manual means with said resilient means and clutch means.

Turning now in more particularity to the clutch means A, the construction may be generally of the type disclosed and claimed in copending U.S. application, Serial No. 163,629, and now U.S. Patent 3,167,163, commonly assigned to the assignee herein, specific features herein being improvements thereover and the disclosure thereof being incorporated herein. The friction means has a driving assembly 20 comprising an annular flywheel 21 adapted for rotation about an axis of rotation 22 by an input means 23; a cover 24 is secured to said flywheel defining a clutch space 25 therebetween. An annular pressure plate 26 is adapted for rotation with said cover by means of flexible retraction straps (not shown) having an offset configuration as described in the above application, wherein rotation of said cover plate is imparted to the pressure plate, and a retraction tendency is residual in said straps even in the fully disengaged condition of the pressure plate.

The friction mechanism further comprises a driven assembly 28 having an annular driven plate 29 interposed between said flywheel and pressure plate and drivingly connected to a driven shaft 30. The driven plate 29 particularly comprises a hub 29a for driving connection to shaft 30, and the outer periphery of the plate 29 has mounted in circumferential space relation thereon a plurality of stamped metal cushions or springs 34 (see FIGS. 4 and 5). The cushions may be arranged with adjacent ones in close end to end relationship. Each of the cushions 34 is of a generally T-shaped configuration having an integral foot portion 35 with oppositely extending toes 36, and an outer flag portion 37 connected to the foot portion by a relatively narrow neck 38. The flag portion has a central area 37a which is substantially flat and adapted to remain unflexed, remote portions having a crown or offset 39 arranged in such a manner that, as the opposite friction facings 31 are compressed or urged together by clutch engagement, the crowns will be flexed and urged toward a flattened condition.

The cushions 34 herein are particularly characterized in that their total reactance force, when fully overcome by the clutch engaging spring during clutch engagement, leaves the cushions in a nonflat condition. Heretofore, cushions of this general type have been designed so that the crown portions 39 have been pressed or flexed back into substantially a flat plane common with the portions 37a during full clutch engagement. Thus, the deflection versus load curve, as shown in full line in FIG. 6 (logarithmic chart along the abscissa) of prior art constructions, shows the reaction force dropping off extremely fast upon a slight deflection from the fully engaged condition. However, if the cushions are arranged either in greater number, size, or have a greater thickness of stock, the cushions will have a stiffer nature to prevent being fully flexed when the clutch is engaged (see broken-line curve in FIG. 6, indicating reactance will not drop off as swiftly as that in the prior art). The total deflection necessary to fully release the cushions is considerably less; the total travel of the clutch pedal is shortened and does not have the characteristic long "tail" indicated in the prior art deflection curve of FIG. 6 which would tend to make torque response less linear. In this particular preferred embodiment the cushions have been constructed of clock spring steel to afford a very low spinning inertia, characteristic of this construction, while increasing the thickness over that normally used to a range of .030 to .040 inch, and maintaining the conventional crown height at .050 to .060 inch. The resulting cushion characteristics, provide a residual flexure when the clutch is fully engaged.

The friction means also comprises an internal lever actuating system 40 including a plurality of levers 41 arranged circumferentially within the cover plate, having their inner ends 41b interengaging a thrust bearing assembly 43 adapted for slidable movement on the driven shaft 30. The levers 41 are fulcrumed by means of a strut 44 interconnecting the outer end 45 of each lever with a coined seat 46 in the cover plate. An intermediate portion 47 of each of the levers 41 is adapted to be interengaged with the pressure plate for transmitting engaging force. An operating lever 48 is fulcrumed on a strut 49, extending between the lever and the clutch housing A-1. The inner end 48a for the operating lever engages the thrust bearing assembly 43, and the outer end 48b of the operating lever is adapted to be actuated through the force transmitting D of this invention.

The actuating lever system 40 of the instant invention particularly utilizes novel antifriction connections between the several members thereof and is more fully discussed in the copending application. Such lever system is employed in combination in this invention and forms a part hereof.

The novel antifriction connections particularly comprise the use of a strut 44 as a fulcrum between the outer end 45 of each of the levers 41 and the cover plate 24, the levers and cover plate having cylindrical recesses or coined seats 46 in which the strut is interengaged and permitted to nutate. Such rocking connection eliminates the normal brinelling of the metal at such localized stress points experienced by the prior art. Furthermore, the intermediate portion of the levers 41 engages the pressure plate by a cylindrical surface 47, adapted to roll upon the flat interengaging surface 26b of the pressure plate. Thus, the rolling motion during operation of the levers 41 substantially eliminates friction and wear therebetween. Rocking contacts are also indicated at the inner ends 41b of levers 41 and at the inner and outer ends 48a and 48b of the operating lever 48.

A spring 48d is disposed in the clutch housing acting between the housing and the inner portion of lever 48; spring 48d enables roll-pin 48e to interengage the bearing 43 and is the only known means for maintaining loosely assembled parts of the "springless" clutch together during assembly in a trumpet-shaped clutch housing.

The manually operated means B comprises pivotal lever 60 carrying a foot pad 61 at one end thereof adapted to receive a manual actuating force, and an opposite end 62 adapted to be connected to the force transmitting means D, as will be hereinafter more fully described. The lever 60 is mounted upon a pivot sleeve 63 journalled in an opening formed in the lever. Sleeve 63 is in turn journalled about a shaft 64, supporting also an element of the braking system of the vehicle. The shaft 64 is supported by suitable mounting brackets 65 (see FIG. 15) fixed to a wall forming part of the body frame B-1 of the vehicle.

The lever 60 is adapted to be maintained in a raised (clutch engaged) position, as shown in FIG. 1, when no actuating manual force is applied. This is promoted by the reaction force and the engaging spring transmitted back through means D-1. Theoretically speaking, the lever 60 requires no resilient means to retain said retracted position; however, a tension spring 66 is employed to maintain lever from floating beyond the engaged point and keep rattles out. Spring 66 is adapted to be connected between a bracket 67 mounted on the vehicle frame B-1 and having an opposite end connected to a portion 60a of the lever disposed between end 62 and pivot sleeve 63. As generally indicated in FIG. 1, the lever 60 is adapted to be moved through first and second zones or movement zones in order to achieve a fully disengaged condition of the friction mechanism. The first zone, as will be more fully described, is utilized during the disengaging movement of the friction portions and may be characterized as the zone where cushion springs are effective as a reaction before separation occurs. Within the first zone there is a subzone where nonslippage is existent, and this will be referred to hereafter. The second zone is where complete separation is realized between the friction portions, and controllability is not as critical.

The force transmitting means D comprises a fixed bracket 70 of stamped sheet metal and formed with a web 71 adapted to be mounted flush against the engine assembly 72 (see FIG. 16), here preferably being the clutch housing. The web 71 is of an oblong rectangular configuration having outwardly extending lips 73 and 74 along opposite edges thereof, and a wing portion 75 extending outwardly on a bias from the web at one longitudinal end 71a thereof. The wing 75 has a slotted opening 76 (a round opening with a connecting slot) formed therein to receive the flexible linkage interconnecting with clutch pedal and to anchor the flexible linkage casing, so that all reaction of the linkage strands will be transferred to a pivotal member, as will be described. Mounting of the bracket to the engine block is facilitated by a biased offset portion 77 having a pair of openings 78 through which cap screws extend to be threadably received by the engine block. The biased offset portion 77 spaces the web 71 from the engine block to accommodate a pivot 79 extending through an opening 80 in the web; the lips 73 and 74 and wing portion 75 form a continuous reinforcing rib about three sides of the web for enhanced rigidity in a flat silhouette.

A reaction plate 82 is pivotally mounted on the fixed bracket and comprises a cylindrical hub 83, force fitted through a central opening 84 of the plate, and fixes the plate on a reduced portion 83a thereof. The hub 83 is journalled on a bearing sleeve 85 which is journalled on pin 86 received in opening 80 of the bracket; the pin 86 is limited against axial movement by virtue of its head 86a (welded to plate) at one end, and a cotter pin 86b extending through openings in the other end of the pin.

The reaction plate 82 employs link means 90 interconnecting each of the friction means, manual means and resilient engaging means with the plate. The points of connection of the means 90 with the plate provide force moments about the pin 86 and the moment arms, important in their disposition and geometrical relationship. First the means D-1 interconnecting the manual means B and the reaction plate 82 comprises a central strand means 91, comprised of flexible cable; the strand means is slidable within a casing assembly 92 including a conduit 93 having a polyvinyl outer cover 94, and a low friction such as Teflon or polyethylene inner liner 93. The casing assembly has one terminal end 92a secured by a ferrule 96 to the wing portion 75 of the bracket 70, and an opposite end 92b fixed by a similar ferrule 97 to a mounting bracket 98 secured in place upon the body frame B-1 of the vehicle. The ferrule 96 has a cylindrical body 96a with an annular groove 96b adapted to receive a clip 89 adapted to be sprung thereinto; the clip 89 has resilient fingers with tips extending slightly inwardly. The assembly 92 is fastened to the head 96c of the ferrule and includes an annular shoulder 96d to abut wing portion 75. The body 96a has a central bore 96e conically shaped at one end to accommodate angular movement of the strand means end.

That portion of the strand means 91 extending beyond the ferrule 96 and fastened to the connector 100 has a longitudinally flexible boot 99 adapted to protect the exposed portion of the strand means from road dirt, having one end 99a snugly fitted about head of ferrule, and an opposite end 99b disposed closely to the connector 100.

The ends of strand means 91 employ metallic connectors 100 having a shank 100a swaged to the strand means and a portion 100b provided with an oblong opening 101 therein, having its center in axial alignment with the strand means 91. The opening is oblong with at least one straight side 101a affording a surface against which a connector pin 102 may roll with little friction.

As shown in FIG. 11, the pin 102 is of a circular cylindrical cross section, having a diameter of slightly less dimension than the smallest width of said oblong opening. During movement of the clutch pedal the line of force of the flexible cable D-1 relative to the reaction plate changes angularly; with conventional connections such pin would normally rotate within a similarly shaped opening, creating a great deal of friction and parasitic loss in transmitted force. With this construction, the pin 102 is adapted to roll upon the straight side 101a of the oblong openings 101, between positions shown in broken outline in FIG. 11. In addition, the usual friction, generated between the relative angular movement of the reaction plate and the portion 100b of the connector, is obviated by constructing the portion with first and second biases relative to the shank 100a of the connector. The first biased portion 108 is directed outwardly from the plane of the shank, with a second biased portion 109 located at the outermost tip of the portion 100b biased slightly inwardly. This insures that the sole contact between the reaction plate and the connector will be at a point shown in FIG. 11 (at the intersection of line 88a extended from the strand means 91 and a transverse line 88b, disposed at the meeting of biased portions 108 and 109) where scrubbing or frictional engagement will be localized to a small area and thereby substantially reduce friction.

The pins 102 are characterized by ease in assembly by having an upset shoulder 110 (see FIG. 8) provided by punching a portion of the pin end 102a to form a protrusion extending from one side thereof and spaced close to the end of the pin. The protrusion forms a lock, whereby the pin may be inserted through the oblong opening in a manner so that the protrusion clears the sides of the opening, and when fully positioned the connector 100 is rotated so that the protrusion locks against the narrower width of the opening.

The resilient means C, providing an engaging force for the clutch, comprises a coiled tension spring 105 having one end 105a connected to a bracket 104 mounted upon the engine assembly, and an opposite end 105b provided with an elongated hook portion adapted to be inserted within one of a plurality of openings 106 provided in a straight link 107. Link 107 is adapted for interconnection with the reaction plate 82 by means of a pin 102 in an oblong opening 101 similar to that used for the flexible linkage connection to the plate. The openings 106 are spaced longitudinally of the link and provide for adjustment of the tension in the spring in steps.

Connecting means 111 is provided to interconnect the outer end 48b of the operating lever of the friction means with a point on the reaction plate 82. Such means comprises an adjustable push-rod 112 having a rounded nose or arcuate surface 113 adapted to engage a mating arcuate surface 114 formed on the end 48b of the operating lever; the nose may rock on the surface 114 without generation of substantial friction. The push-rod employs a connector 100 similar to that for the strand means 91 and has a shank 115 threadably received within a threaded bore 116 in the push-rod. This threaded interconnection provides a wear adjusting feature, whereby the length may be varied to compensate for change in stroke of the operating lever. The connector 100 cooperates with a pin 117 similar to pin 102, except that it is longer and has side 101a oppositely disposed relative to opening 101, since the connector pushes rather than pulls. The connector 100 and pin 117 possess the same antifriction and ease of assembly characteristics as described above.

*Geometry of force transmitting means*

To achieve a soft pedal start, the geometrical disposition of the forces acting on said reaction plate 82 must be critically (here used not to mean sensitive or hairline proportion, but rather important to inventions) arranged.

For analysis, it is well to speak in terms of moments (the tendency of a force to rotate the body on which it acts about a central axis, the moment being represented by force multiplied by distance with a particular direction) of such forces about the pin 86. It is well known that for a static body the sum of moments about a point equals zero. Thus, referring to FIG. 7, the equation for the position of the pivotal member when the clutch is fully engaged is $Ss-Rr-Pp=0$.

S=Spring force (having a positive direction);
s=Moment arm of spring force;
R=Clutch reactance force, including spring cushions and the drive straps (having a negative direction);
r=Moment arm of reactance force;
P=Pedal force provided by operator (having a negative direction);
p=Moment arm of pedal force.

From this equation it can be seen that the moment of the pedal force will always be equal to the difference between the spring force and the clutch reactance force.

The moment arm $r$ has particular significance to this invention. The point of connection of the push-rod to the reaction plate is chosen so that, as the reaction plate moves through an arc responsive to movement of the clutch pedal from the engaged to the disengaged position, the moment arm $r$ will increase (here chosen to increase to a maximum with the line of the force perpendicular to the connection arm). The moment arm $r'$ (as shown in FIG. 7) is that for the disengaged condition of the clutch. The geometrical relationship of the push-rod to the reaction plate may be stated in other terms for those embodiments utilizing positive links; the angle formed between the pivot arm (a line drawn between the pivot pin 86 and the point of connection of the push-rod to the reactance plate) and the direction of the clutch reactance force (being the longitudinal direction of the push-rod) will be obtuse when in the engaged condition of the clutch, and become less obtuse as the clutch is moved toward disengagement. In other embodiments employing a type of connection between the reaction member and the operating lever 48, such as a roller or camming operation, reference must always be to the increasing moment arm for the reactance force relative to the pivot pin 86.

In FIG. 13, the change in moment for the clutch reactance force is shown for the full stroke of movement of the clutch pedal by broken-line for a typical prior art construction, such as in the U.S. Patent 2,296,535, and in full line for the invention herein. In the prior art construction the moment arm of the reactance force would be at a maximum when the clutch is fully engaged; with the invention herein the moment arm $r$ is at a minimum for the same condition of the clutch and thus to compare systems the moment or torque of the prior art construction will be at an increment above that for the invention. But it should be noted that, as the clutch is brought toward disengagement, the reactance force of the prior art construction drops off relatively rapidly for small increments of push-rod travel (or deflection in pressure plate) as compared to the rate of drop off of the reactance force of the preferred embodiment. The two curves will intersect after some degree of push-rod travel and the moment of the preferred embodiment, when the pressure plate is disengaged from the driven plate, will be slightly higher than that of the prior construction due to the increased moment arm in such zone.

Turning now to the spring force S, the moment arm $s$, represented in FIG. 7 for the engaged condition of the reaction plate, is longer than the moment arm $r$ for the reactance force; the proportioning of the moment arms is dependent upon space and convenience in using a particular size of engaging spring. It is significant to note that the moment arm $s$ is arranged to decrease to $s'$ as the clutch is moved toward disengagement, whereby pedal effort will be maintained at a comfortable level after the reactance force has exhausted itself by separation of the pressure plate from the driven plate. The use of a decreasing moment arm for the spring force is known in the art, as represented in the U.S. Patent 2,296,535. It is not practical to reverse the direction of change of the moment arm of the spring force to manipulate the moment arm of the reactance force in attempt to achieve the same effect as this invention teaches. Without a decreasing moment arm for the spring force the ultimate pedal load would be so great that it would not be acceptable to even the most robust operator. Although the spring force becomes increased as it is stretched to a greater tension during disengagement, the rapidly decreasing moment arm offsets this to provide a gently decreasing curve, as shown in full outline for the prior art construction. Such spring curve must have a moment equal to the moment of the reactance force when the clutch is fully engaged.

As indicated by the moment equation above, the pedal moment $Pp$ will be equal to the difference between the spring moment and the clutch reactance moment. The most desirable shape for the pedal moment curve is subject to variable opinions. There are generally two schools of thought, one being that the pedal moment curve should have a generally flat configuration (drop-off should be limited) after it has reached its peak moment as the clutch pedal proceeds to full disengagement. This first school of thought believes that it is uncomfortable for a driver to experience a drop in load near the end of the clutch stroke; it is believed the driver has greater controllability and experiences less fatigue if he can rely upon uniform input pressure as the stroke proceeds. The other school of thought feels that there should be a significant drop-off to get a full release near the end of the clutch stroke.

For those of the second school of thought, the preferred embodiment meets all requirements. For the second school of thought, the curve may be qualified by reducing the peak pedal load accompanied by a slight lessening of the drop-off near disengagement by utilizing an assist in arranging the geometry of the pedal force. If the pedal force P acts through a moment arm $p$, arranged so that during the angular travel of the plate the moment arm $p$ experiences a slight increase and then a greater decrease to $p'$ as it proceeds towards disengagement, the greater decrease will provide a slight degree of change in the pedal moment curve from that if a generally constant moment for the pedal force is used.

Also, for those of the second school of thought, an alternative arrangement for the spring force connection may be utilized, as shown in FIG. 14, to provide a greater degree of preventing drop-off. This arrangement provides a stop pin 120 secured to the reaction plate and is adapted to abut the link 107 as the clutch pedal is moved into the second zone of travel. The pin is arranged so that the link 107 is caused to pivot outwardly (away from the pin 86) as further movement during the second zone proceeds. This has the effect of slowing down the rate of decrease of moment arm $s$ of the spring 105 to $s''$ relative to the pin 86 in the second zone and thereby tending to flatten the moment curve of the pedal force near the trailing end (see FIG. 13), and permitting the initiating moment arm $s$ to be chosen of a smaller value, thereby lowering the peak pedal effort as well as flattening it. Other embodiments may be conceived within the scope of this invention, where a stop pin 120 would be employed upon the link or spring extension and adapted to abut the reaction plate upon a specific angular travel to increase the spring moment arm during the last zone of travel; such example would be a reversal of parts from that shown in FIG. 14.

*Rate of pressure plate travel responsive to clutch pedal movement*

It is important during the first zone of travel of the clutch pedal that the pressure plate be less sensitive to pedal movement so that controllability is increased beyond that experienced in the second zone of travel; it is important that during the second zone of travel, where separation of the pressure plate from the driven plate occurs, that sensitivity increase so that there will be less hunting of the pressure plate. To this end, the moment arm $r$ of the reaction force is arranged on the reaction plate so that during the first zone of travel of the clutch pedal each unit of movement of the reactance plate will impart a relatively small linear increment of movement (in the direction of the push-rod), as compared to the linear movement that will be imparted during the second zone of travel. This results from arranging the pin connection so that the line of reaction force through the push-rod 112 moves toward a tangent to the arcuate path of the pin 117 so that such change of linear movement is experienced. Thus, the pressure plate is caused to respond in a different rate of movement during the disengaging operation in response to continuous manual effort applied to the clutch pedal. Also, during the sub-zone indicated in FIG. 1, the lever 60 can travel a greater distance with such a small pressure plate deflection, during non-slippage, to build in a movement equivalent to lost-motion.

*Enhanced calibration of force transmitting means*

An important feature of this invention is the elimination of the usual pantograph linkage that has normally been used to interconnect the clutch pedal with the clutch mechanism, (see U.S. Patent 2,296,535). Such pantograph linkage systems have been rather bulky and difficult to construct, so that the force transmitted would be with adequate efficiency. If the system was designed to substantially eliminate parasitic frictional losses in the connections of the linkage, the available spring engaging force and reaction forces could be made smaller and more effective to do their job. Pursuant to this, the invention contemplates utilizing the flexible linkage D-1, described above, which is virtually friction-free, while being capable of accommodating a variety of installation requirements. To insure that the flexible linkage D-1 is as low in friction dissipating aspects, it is best to arrange the cable so that it has a gentle bow while lying in a single plane passing through the connector 96 stationed at the wing portion of the bracket 70, and the connector 97 mounted on the frame adjacent the clutch pedal mounting (see FIG. 15). If the linkage D-1 is given a compound curvature between the connected parts of the casing, difficulties will be encountered in servicing and greater frictional losses will occur. The flexible linkage also serves to isolate the relative motion experienced between the engine assembly and the frame of the vehicle (see FIG. 16), illustrating the mounting of the engine assembly 72 on rubber blocks 130 to accommodate relative motion therebetween. With the elimination of uncertainty due to relative movement of the connected parts of the linkage of the clutch, the required forces to operate the clutch can be more accurately determined without the necessity for margins of fluctuation.

The use of the unitary reaction plate also permits precise and more accurate calibration of the transmitted forces. Since all the forces (from the three components of the clutch actuating system) are tied into a single reaction plate, the geometry can be controlled within extremely close limits. Thus, during a typical stamping operation of the reaction plate, precise moment arms can be formed, which is not easy to achieve if extended linkage were used in place of a unitary reaction plate.

*Flexibility of use and extended life*

With the use of flexible linkage D-1 interconnecting the forces acting on the reaction plate with the clutch pedal, the elimination of back-lash or a lost-motion connection at the clutch pedal is provided. Thus, in the engaged condition of the clutch, the clutch lever 60 is held in an upright inactive position by the spring C reaction transmitted through the flexible linkage. The pedal 61 is free to adjust its starting position within a range of limits to constantly maintain the clutch in precise adjustment. This is not true in prior art constructions, where between the recommended intervals of clutch adjustment slight misadjustment is provided. With this type of automatic wear adjuster, the wear of the friction facings cannot effect the plate load and inject another variable which must be compensated in calibration.

To provide increased flexibility of use, the unitary reaction plate enables the user to change the capacity of the clutch by substituting another reaction plate with varying geometry to meet the requirements. Or, the engaging spring, being remotely disposed and easily disconnected, can be substituted with another spring of varying capacity. Each of these substitutions are of a simple nature and permit the components of the clutch system to meet many more situations than are now available by conventional clutches.

The concentration of the force transmitting geometry in a single unitary reaction plate also permits the pedal effort curve to be adjusted at the extremes of movement to fit the customer's desires. This has been described above in connection with FIG. 14.

Turning now to FIGS. 17–19, wherein is illustrated an alternative embodiment, similar parts to those in the preferred embodiment will have similar reference numerals prefixed by S. The manual means comprises a clutch lever carrying the usual clutch pad S61 at the bottom extremity thereof; the clutch lever S60 has an opening S64 at one end thereof and a first sleeve joined to the lever concentric wtih said opening. Said sleeve being rotatively mounted upon a shaft S66 mounted upon the vehicle frame by bracket S65; said sleeve S63 being adapted to rotatively carry a brake lever disposed to the right of the clutch lever. At the rightmost terminal end of the clutch shaft S66 is mounted an arm S160 disposed on a bias relative to the clutch lever (shown in FIG. 17) and adapted to be connected to the linkage means D-1. The arm has a forked end S160$a$ and is adapted to pivot therewith. The arm has its ends slightly offset so that the end S160$b$ of the arm is disposed in line with an opening S67$a$ of a bracket S67 mounted on the vehicle frame B-1 and to which is mounted one terminal end portion of the linkage means D-1 casing. A retention spring S66 for the clutch lever is disposed with one end fastened to the bracket S162 attached to the forked arm and an opposite end is attached to a portion of the bracket S67. The manual means mounting permits the flexible linkage D-1 to lie within a substantially flat plane accommodating variations of the vehicle installation.

The force transmitting means of this embodiment is particularly characterized by the employment of a rocker arm S163 stamped from sheet metal and having coined arcuate surfaces to receive contacting portions of the other parts of the force transmitting means. The rocker arm is substantially cup-shaped, having a peripheral lip (FIGS. 18 and 19) and a web S165 portion carrying said coined seats on opposite sides thereof. The rocker arm is pivotally mounted upon a bracket S166 secured to the engine assembly S72, the bracket being characterized by a flat body portion S167 having a mounting flange S168 at substantially right angles thereto for being secured to the engine assembly, a wing portion S169 extending outwardly from the body portion and adapted to receive the connector S96 of the casing assembly S92 of the linkage means D-1, and a lip S170 extending outwardly from the bottom of the body portion to which is mounted a flat strut S171 secured thereto by welding. The lip S170 and wing portion S169 may be a continuous peripheral extension of the body portion, as shown in FIG. 10, to add rigidity to the mounting bracket. The strut has an edge S171$a$ having an arcuate nose adapted to be rockingly received by an arcuate surface S171$b$ formed in the left-hand side of the rocker arm, as shown in FIG. 10.

The strut forms a pivot for the rocker arm and is disposed relative to the rocker arm at the bottom half thereof, which is reversed from that of the pivot disposition of the preferred embodiment.

The flexible cable linkage D–1 is adapted to connect with the rocker arm by having the strand means S91 extend through the small opening S172 in the upper end of the rocker arm, which is adapted to carry a spherical plug S173 adapted to rockably be received within a coined seat S174 of the right-hand side of the rocker arm. The other end of the linkage D–1 is connected to the lever S60 by a stirrup S200; the stirrup has the strand means connected thereto by a plug S201 and the stirrup connects to the lever by pin S202 received in oblong openings S203. The push-rod connects with the rocker arm by use of a rounded nose portion S175 received within an arcuate surface S176 formed in the right-hand side of the rocker arm, and located between the linkage D–1 connection and the pivot S171. The spring S105 is adapted to be connected to the rocker arm at the bottom extremity thereof, and utilizes a pin S177 extending transversely of the rocker arm received within an arcuate channel S178 thereof, and to which the spring end S105a, having a flat portion S105b, is hooked.

Each of the above connections are alternative ways of providing antifriction connections; the disposition of the reaction forces, as applied to the rocker arm, are substantially reversed in geometry from that shown in the preferred embodiment. However, the increasing moment arm of the push-rod connection is maintained with a decreasing moment arm of the spring force, as said rocker arm is moved toward the clutch disengaged position.

Other elements of the clutch linkage system, similar to those of the preferred embodiment, have similar reference numerals applied.

Turning now to FIGS. 20–23, still another alternative embodiment is illustrated with similar parts having similar reference numbers prefixed by T. The manual means B of this embodiment has a simple clutch lever with an integral extension T180 at the upper end thereof and offset to one side of the pivot T181 to which is connected the flexible cable linkage D–1. Such unitary clutch lever is possible by virtue of the convenient disposition of the cable linkage D–1, immediately adjacent the clutch lever.

The force transmitting means D of the embodiment T, as shown in FIG. 22, employs a flat reaction plate T82 mounted pivotally upon a bracket T70, substantially the same as in the preferred embodiment. However, the geometry in interconnection of the manual means B, resilient means C and clutch reaction means R is substantially different. First, the plate is arranged with the resilient means C interconnected between a position on the outer extremity of the clutch housing T190 and a bottom portion of the plate T82, so that the spring force is substantially in a right-hand direction (FIG. 13). The flexible cable linkage D–1 is connected to the reaction plate having a force direction generally at right angles to the line of force of the resilient means. The rotative direction of the forces is opposed, and thus the moments of such forces are opposed relative to the pivot of the reaction plate; but the moment arms are retained in conformity with the concept of the preferred embodiment. The clutch reactance force is applied through an adjustable push-rod T111, employing a forked connection with the reaction plate. This forked connection comprises a forked piece T191 integral with a threaded extension T192; the push-rod is adapted to be rockably received upon a coined slot T193 in the edge of the reaction plate T82. This has an improved feature wherein the push-rod may be disassembled by manually urging the operating member T48 of the clutch to the right and removing the forked piece from its slot. Such connection permits the ready and easy dismounting of the clutch means for examination.

The embodiment of FIG. 21 may be modified by a pin assist of the character shown in FIG. 23; the pin T120 is joined to the link T107 interconnecting with the spring T105, and will be interrupted from its normal arcuate movement when the pin T120 contacts the edge of the plate T82 (position 2). Further movement of the plate T82 pivots link T107 about pin T102 as well as about pivot T79. The moment arms $s''$ (at disengaged position) will be longer than the moment arm $s'$ normally experienced at disengaged by the configuration in FIG. 20. This provides the flattened curve, as shown in FIG. 13, for a pin assist.

In FIG. 14 is illustrated a construction or alternative pin assist adapted for the embodiment of FIG. 1. The pin 120 is integrally disposed on the reaction plate 82 and is adapted to engage the edge of the link 107, interconnecting the end of the spring S with the pivotal connection 102. The link 107 will be interrupted from its normal arcuate movement when the pin 120 contacts the edge of the link (see intermediate disengagement position, as shown in broken outline in FIG. 14). Further movement of the plate 82 pivots the link 107 about the pin 102 as well as about the pivot 79. The moment arm $s''$ (at full disengagement) will be longer than the moment arm $s'$ normally experienced at engagement by the configuration shown in FIG. 1. This again provides the flattened curve, as shown in FIG. 14, for a pin assist. It should be noted that the interconnection between the link and the spring and reaction plate is provided with the antifriction type of connections to reduce frictional losses.

Yet still another embodiment is illustrated in FIG. 24, wherein similar parts to that of the preferred embodiment are indicated with similar reference numerals prefixed by V. This embodiment is characterized by the use of roller and camming means transmitting the reaction force between the operating member of the clutch and the reaction plate of the force transmitting means. The disposition of the geometry of the forces of the resilient means and the flexible cable linkage is substantially the same as that of the preferred embodiment, but the push-rod is substituted by a roller V195, rotatably mounted on a portion V196 of the reaction plate coincident with the point of connection of the usual push-rod. The outer periphery of the roller is adapted to engage an arcuate camming surface V197 of the operating member; the moment arm $r$ of the reactance force about the pivot of the reaction plate will be the shortest distance between the pivot and a line drawn perpendicular to the tangent of contact between the roller and the camming surface. However, it is important that the moment arm of such reaction force be of an increasing nature as the clutch is moved towards disengagement to afford the features above described.

While I have described my invention in connection with a certain specific construction and arrangement as well as alternative embodiments, it is to be understood that this is by way of illustration and not by way of limitation, and that the scope of my invention is defined solely by the appended claims, which should be construed as broadly as the prior art will permit.

I claim:

1. A friction mechanism comprising: friction means having a first portion and a second portion adapted for interengagement, at least said first portion having a friction facing carried by resilient cushions thereon, said cushions being adapted to be substantially flexed when said portions are fully interengaged, thereby exerting a maximum reaction force upon the second portion of said friction means tending to urge them apart; manually operated means movable between a friction means engaging position to a friction means disengaging position; resilient means normally urging said portions into interengagement and having maximum effectiveness during the engaging position of said manual means; and force transmitting means interconnecting said manual means with said resilient means and friction means about a common pivot, that portion or the transmitting means connecting the friction means to said pivot being effective to reduce the loss of turning moment of the reaction force from said cushions about the pivot as said manual means is moved to closely approach the fully disengaged position.

2. A friction mechanism as in claim 1, in which said force transmitting means more particularly comprises a reaction plate pivotal about a fixed pivot and link means connecting said manual means, resilient means and friction means to said reaction plate, the moment arm of said link means connecting with said friction means being arranged so that it is continuously increasing as said reaction plate is pivoted by said manual means.

3. A clutch adapted to be positioned in a housing comprising a driving member, a pressure plate, and a driven member rotatably positioned within said housing for rotation about an axis, a cover plate interposed between said housing and said pressure plate, lever means connected to said cover plate effective to provide for movement of said pressure plate from said driving member, said lever means comprising a plurality of first levers disposed within said clutch housing, each of said first levers having an outer end fulcrumed on said cover by struts interposed therebetween and having an intermediate portion effective to engage said pressure plate with a rolling contact, said lever means also including a clutch operating member disposed partly within said clutch housing having an intermediate portion pivoted upon a strut interposed between the housing and the operating member, said operating member having means at an inner end effective to transmit force to the inner end of said first levers, a push-rod for connecting with the outer end of said operating member, said push-rod having a rocking contact with the end of said operating member and having means to retain engagement therewith, resilient means located exterior of said housing and effective to exert a force against said lever means to urge said pressure plate toward said driving member, and manual means for overcoming the effect of said resilient means, said clutch being particularly characterized by the inclusion of force transmitting means which comprises in part said push-rod and commonly interconnects said lever means, resilient means, and manual means about a fixed pivot and employing a universally flexible linkage connecting to said manual means.

4. A friction mechanism as in claim 1, in which said first portion of said friction means comprises an annular driving flywheel and an annular pressure plate coupled to said flywheel by resilient retraction straps, said second portion comprising an annular friction plate adapted to be driven upon interengagement and having a plurality of circumferentially arranged sheet metal cushions secured to the outer periphery of said plate with friction facings secured to opposite sides of said cushions, said cushions being adapted to be compressed as said flywheel and pressure plate are brought closer together, said cushions being particularly characterized in that they are effective to be partially flexed when said friction mechanism is fully engaged, thereby providing residual flexure to accommodate changes in cushion structure during the life of the mechanism.

5. A friction mechanism, comprising: friction means having interengageable friction portions; resilient means normally urging said friction portions toward a fully engaged condition; manually operated means movable from a friction means engaging position through first and second zones to a friction means disengaging position; force transmitting means interconnecting said resilient means and said friction means about a common pivot and being responsive to the movement of said manual means to overcome the effect of said resilient means for gradually separating said friction portions, said force transmitting means connecting said friction means to said pivot being effective to provide smaller units of separation movement of said friction portions for each unit of movement of said manual means in said first zone than for each unit of movement of said manual means in said second zone, whereby the controllability of said friction mechanism is increased during said first zone.

6. A friction mechanism as in claim 5, in which said force transmitting means comprises a pivotal reaction plate having linkage means interconnecting a point thereon respectively with each of said means, resilient means, and said manual means, said linkage means connecting said plate with said friction means being particularly characterized in that the angle defined by the line of force transmitted by said linkage means and a line connecting the pivot with the line of force of said linkage means varies from an obtuse angle to a less obtuse angle as said manual means is moved from the engaging position of the mechanism to the disengaging position thereof, and the included angle defined by the linkage means connecting said resilient means with the reaction plate and a line drawn from the pivot to the point of connection of said linkage means for the resilient means becoming more acute during said movement of said manual means.

7. A friction mechanism, comprising: friction means having interengageable friction elements; resilient means adapted to normally urge said friction elements into full interengagement; manually operated means movable through a first and a second zone from a fully engaged position of said friction means to a disengaged position of said friction means; force transmitting means interconnection said friction means with said resilient means and with said manually operated means, said force transmitting means being particularly characterized by an operating lever having a camming surface thereon; a pivotal crank having a camming member thereon adapted to engage the camming surface of said operating member and provide interconnection with said friction means, said manually operated means and resilient means being connected with said crank so that for each unit of movement of said manual means in said first zone the friction means will be moved a unit movement smaller than when said manual means is moved through said second zone.

8. A friction mechanism as in claim 7, in which said camming member comprises a roller and wherein the interconnection between said roller and said camming surface of said operating member is arranged so that the line of transmitted force between said roller and camming surface has an increasing moment arm as said manually operated means is moved from the fully engaged position to the disengaged position.

9. A friction mechanism for a vehicle having a mounting independent of a body frame, comprising: friction means adapted to provide for transmission of torque to operate said vehicle; resilient means adapted for normally uring said friction means into a coupling condition and being remotely disposed from said friction means, force transmitting means comprising a reaction plate carried on said mounting and interconnecting said friction means, resilient means, and manually operated means, said force transmitting means being particularly characterized by the inclusion of universally flexible linkage interconnecting said manually operated means and said reaction plate with said reaction plate operatively mounted on said mounting whereby foreign movements and road vibrations are isolated from the operation of said friction mechanism thereby to ensure more precise calibration of said force transmitting means to meet all conditions of operation, said flexible linkage comprising a force transmitting strand enclosed within an outer casing, said casing having one terminal end secured to said mounting and an opposite terminal end fixed to said vehicle frame, the reaction forces of said manually operated means, resilient means and friction means being absorbed by said reaction plate while maintaining an effective geometrical relationship under all conditions of operation of said mechanism.

10. A friction mechanism as in claim 9, in which said reaction plate comprises a substantially flat plate having said linkage interconnecting with said clutch means, manual means and resilient means connected to respective points on said plate, said plate permitting the moment arms of said linkage forces to be more accurately predetermined and maintained during all operating conditions.

11. A friction mechanism as in claim 9, in which said interconnection between the plate and interconnecting linkage comprises male and female elements, said female element being particularly characterized by the provision of a generally flat surface, the male element comprising an arcuately shaped surface adapted to roll against said female surface thereby substantially reducing frictional losses encountered between such connections.

12. A friction mechanism as in claim 9, in which at least one of said interconnections between said reaction plate and said resilient means, manual means and friction means comprises an arcuate surface disposed on one of said reaction plate or respective connecting linkage and including a strut having opposite edges thereof in engagement with said arcuate surface, whereby said strut may nutate during relative movement between said plate and interconnecting linkage to eliminate friction while transmitting full effective force.

13. A clutch mechanism, comprising: clutch means adapted to selectively provide transmission of torque; manually operated means for effecting engagement and disengagement of said clutch means, resilient means disposed remotely from said clutch means adapted to normally urge said clutch means into a torque transmitting condition; and force transmitting means disposed remotely of each of said clutch, manual and resilient means and particularly comprising a pivotal member adapted for detachment, flexible linkage interconnecting said manually operated means with said pivotal member, push-rod means interconnecting said pivotal member with said clutch means, said pivotal member being particularly characterized by means interconnecting said push-rod, resilient means and flexible linkage therewith, said connection means comprising an opening in one of said pivotal member or respective linkage, and a pin secured to the other thereof, said pin having a generally smooth cylindrical surface interrupted by a protrusion at one end thereof, said openings having an oblong configuration so that said pins may be locked therein by rotation within said openings, said pivotal member being replaceable to vary the torque capacity of said clutch by varying the point of connection of said reaction forces and their moment arms about said pivotal member.

14. A frictional mechanism as in claim 13, in which said pivotal member comprises a generally flat bracket having a wing portion disposed on a bias relative to the plane of said bracket, said pivotal member further comprising a substantially flat stamped sheet metal reaction plate pivotally mounted on said bracket, and in close spaced parallel relation therewith, said flexible linkage comprising a central strand means adapted for movement within a casing assembly, said casing assembly having one terminal end secured to said wing portion of said bracket and permitting said strand means to extend therethrough interconnecting with said reaction plate.

15. In a vehicle having an engine assembly supported independently of a body frame, a clutch mechanism for selectively transmitting torque from said engine and comprising: clutch means comprising a housing assembly, a cover, an annular friction driven plate having a plurality of arcuately arranged resilient cushions carrying friction facing material, and pressure plate means adapted to engage said friction material in a manner to substantially flex said cushions for providing full clutch engagement, a plurality of levers fulcrumed on said cover and adapted to impart thrust to said pressure plate means, an operating lever fulcrumed on said housing having one end adapted to impart thrust to said plurality of levers and an opposite end carrying an arcuate surface; clutch engaging means comprising a coiled tension spring arranged for normally urging full engagement of said clutch means; clutch release means comprising a pedal lever pivotally mounted and movable between a clutch engaging position through first and second zones to a clutch disengaging position; and force transmitting means interconnecting each of said engaging means, release means and clutch means, said force transmitting means comprising a bracket mounted upon said engine assembly and having a wing portion extending on a bias outwardly therefrom and having an opening therein, a reaction plate pivotally mounted on said bracket and lying in parallel close spaced relation with said bracket, flexible linkage interconnecting one end of said pedal lever with one point of said reaction plate and comprising a flexible strand means movable within a casing assembly, one terminal end portion of said casing assembly being secured to said wing portion of said bracket and having the strand means extending through said portion opening, the opposite end of said casing assembly being fixedly secured against movement, a push-rod interconnecting one point of said reaction plate with said operating lever, said push-rod having an arcuate nose adapted to be rockably received in said arcuate surface of said operating lever, means for retaining said nose and arcuate surface in operative relation, a link interconnecting said coiled spring with a point on said reaction plate, said mechanism being particularly characterized in that the connection of said push-rod to said reaction plate is arranged so that in moving said pedal lever from the engaged to the disengaged position the moment arm of the push-rod about said plate pivot increases, said spring link being connected to said reaction plate in a manner so that the moment arm of said engaging spring decreases as said pedal lever is moved toward disengagement, said connections of said push-rod and spring links further being characterized and arranged so that for each unit of movement of said lever pedal during the first zone of travel the pressure plate means is caused to move a smaller unit of movement than through the second zone of travel, said connections of said spring link, push-rod and strand means being further characterized in that the male element is adapted to be pivoted within an oblong opening of said reaction plate to provide a locking relationship, and which permits opposite pivoting for easy disassembly whereby said reaction plate may be substituted with a variable one to change the entire capacity characteristics of the clutch mechanism.

16. A friction mechanism, comprising: friction means having interengageable friction elements; resilient means adapted to normally urge said friction elements into full interengagement; manually operated means movable between a fully engaged position of the friction means to a disengaged position of the friction means; force transmitting means interconnecting said friction means, resilient means and said manually operated means, said force transmitting means being particularly characterized by a unitary reaction plate having said resilient means, friction means and manually operated means connected to independent locations thereon and each providing a moment about a common pivot of said reaction plate, said reaction plate being effective to increase the moment arm of said friction means about said pivot and decrease the moment arm of said resilient means about said pivot as said manual means is moved from the friction engaging to the disengaging position, said force transmitting means being further characterized by means effective to offset the expected decrease in moment arm of said resilient means about said pivot as said manual means closely approaches the fully disengaged position.

17. A friction mechanism as in claim 16, in which said offsetting means particularly comprises a link interconnecting said resilient means with a point on said reaction plate and including a stop positioned on said reaction plate effective to engage said link as said manual means closely approaches the disengaging position so that said link is pivoted by said pin to move the line of force of said resilient means further away from said reaction plate pivot and thereby tending to offset the normal decrease in moment arm of said resilient means about said pivot.

18. For use in a clutch system operable between clutch engaging and clutch disengaging conditions and employing clutch means having interengageable friction elements with at least one element having a friction facing carried by resilient cushions thereon, said cushions being adapted to be substantially flexed when said portions are fully interengaged thereby exerting a maximum reaction force upon the other of said elements tending to urge the elements apart, resilient means normally effective to urge said elements into interengagement, manually operated means for overcoming the effective of said resilient means, a linkage for interconnecting said manual, clutch, and resilient means respectively, the combination comprising; a mounting bracket, a common reaction member rockable on said bracket about a fixed pivot thereof, and links for respectively connecting each of said manual, clutch and resilient means to predetermined spaced portions of said member whereby the geometrical moment arms described by the connected relationship will permit the link connected to the clutch means to retard the loss of turning moment of the cushion reaction force with respect to said pivot as said system closely approaches the clutch disengaging condition.

19. A linkage as in claim 18, in which a link is connected, the one of said resilient, manual, or clutching means is connected thereto by means defining an opening having at least one generally straight edge, a pin extending through said opening in a manner to rollingly bear against said straight edge for providing an antifriction connection therebetween.

20. A linkage as in claim 19, in which said means defining said opening is generally bladed with a fold therein adjacent said straight edge so that the crown of said fold is effective to localize any possible contact with other structure.

21. A linking as in claim 18, which further comprises stop means mounted on one of said link, resilient means, manual means, or clutching means to limit the rate of change of the moment arm therebetween at some intermediate position and thereby augment said moment arm.

References Cited by the Examiner

UNITED STATES PATENTS

| | | | |
|---|---|---|---|
| 2,170,172 | 8/1939 | Wemp | 192—99 |
| 2,275,158 | 3/1942 | Nutt | 192—89 |
| 2,275,388 | 3/1942 | Wemp | 192—89 |
| 2,296,535 | 9/1942 | Nutt | 192—99 |
| 2,311,997 | 2/1943 | Pearson | 192—89 |
| 2,321,513 | 8/1943 | Reed | 192—99 |
| 2,367,076 | 1/1945 | Varblow | 192—99 X |
| 3,167,163 | 1/1965 | Smirl et al. | 192—99 X |

FOREIGN PATENTS 74,601   9/1918   Austria.

DAVID J. WILLIAMOWSKY, *Primary Examiner.*

DON A. WAITE, *Examiner.*

B. W. WYCHE, III, *Assistant Examiner.*